United States Patent

[11] 3,601,549

[72] Inventor Doren Mitchell
Martinsville, N.J.
[21] Appl. No. 879,801
[22] Filed Nov. 25, 1969
[45] Patented Aug. 24, 1971
[73] Assignee Bell Telephone Laboratories, Incorporated
Murray Hill, N.J.

[54] SWITCHING CIRCUIT FOR CANCELLING THE DIRECT SOUND TRANSMISSION FROM THE LOUDSPEAKER TO THE MICROPHONE IN A LOUDSPEAKING TELEPHONE SET
6 Claims, 2 Drawing Figs.

[52] U.S. Cl. .......... 179/81 B, 172/1
[51] Int. Cl. .......... H04m 1/20
[50] Field of Search .......... 179/1 A, 1 HE, 1 FS, 81 B, 100 L, 170.2; 325/12

[56] References Cited
UNITED STATES PATENTS

| | | | |
|---|---|---|---|
| 2,166,775 | 7/1939 | Varley .......... | 179/1 FS X |
| 2,980,769 | 4/1961 | Lawsine .......... | 179/1 FS |
| 3,075,045 | 1/1963 | Clemency .......... | 179/81 B X |
| 3,428,754 | 2/1969 | Hoyler .......... | 179/1 FS UX |

*Primary Examiner*—Ralph D. Blakeslee
*Attorneys*—R. J. Guenther and E. W. Adams, Jr.

ABSTRACT: A loudspeaking telephone set wherein a pair of gates are respectively disposed in the transmit and receive channels for the purpose of simultaneously enabling and disabling the same at a high frequency rate. A frequency control circuit adjusts this high frequency rate so that the pulses of direct sound energy from the loudspeaker arrive at the microphone just at the time that the microphone transmit channel is disabled. The undesired direct sound transmission (i.e., direct acoustic feedback) is thus cancelled out.

INVENTOR
D. MITCHELL
BY John K. Mullarney
ATTORNEY

SWITCHING CIRCUIT FOR CANCELLING THE DIRECT SOUND TRANSMISSION FROM THE LOUDSPEAKER TO THE MICROPHONE IN A LOUDSPEAKING TELEPHONE SET

BACKGROUND OF THE INVENTION

This invention relates to voice communication systems, and more particularly to telephone apparatus using microphones and loudspeakers, respectively, as input and out transducers.

Loudspeaking telephone sets, often referred to as speakerphones, are characterized by a transmitting channel including a microphone and a receiving channel including a loudspeaker. Such sets have been used extensively heretofore, and they will undoubtedly continue to be widely used. Loudspeaking telephone sets, unfortunately, present certain inherent problems, the most significant probably being that of acoustic coupling or feedback. The latter effect occurs when sound energy produced by a speakerphone's loudspeaker is transmitted directly to the set's microphone and thence back to the remote talker as objectionable echo. Delayed room echoes and reverberations also result in similar return echoes, but the energy content of the latter is usually substantially less than that attributable to direct sound transmission and hence the same is not as objectionable.

This troublesome direct sound transmission can be substantially reduced by using a directive microphone so placed that the loudspeaker is in its null zone. This is generally effective, but it does require the use of very good directional microphones accurately positioned relative to the respective loudspeakers. And, of course, there is inevitably still some direct sound transmission even with a loudspeaker in the microphone's null zone.

In addition, voice-switching arrangements using variolossers in the transmit and receive channels have been employed in an attempt to minimize acoustic coupling by controlling the energy propagating through the respective lines or channels such that only one of the channels is effectively operative at a time. Under the control of signals derived from speech energy in the transmit and receive channels, the variolossers function to vary inversely the insertion loss in the respective channels. Here again, however, this voice-switching approach is not without its attendant difficulties. A particular problem, but by no means the only one associated with voice-switching arrangements, is known in the art as "transmit lockout." This occurs when the switched loss network in the channel of one of the parties precludes him from readily breaking in on the speech of the other. The objectionable echoes may be completely suppressed, but at the sacrifice of a fully duplex circuit connection. It is desirable to hold the amount of voice-switched loss as low as possible to minimize these effects. Accordingly, the primary object of the present invention is to cancel out the direct sound transmission from the loudspeaker to the microphone in loudspeaker telephone sets.

A related object is to eliminate the direct sound transmission from the loudspeaker to the microphone while removing the constraint of precise positioning required in prior art arrangements using highly directional instruments.

A still further object of the invention is to substantially reduce acoustic feedback so as to allow voice-switched loss to be minimized without adversely affecting the circuit connection by introducing transmit lockout and the like.

SUMMARY OF THE INVENTION

In accordance with a specific embodiment of the present invention a pair of gates are respectively disposed in the transmit and receive channels of a loudspeaking telephone set and they are simultaneously enabled and disabled at a high frequency rate. Thus the audio paths going to the loudspeaker and coming from the microphone are both interrupted at a given high frequency on-off switching rate. The high frequency switching rate is controlled so that the pulses of direct sound energy from the loudspeaker arrive at the microphone just at the time that the microphone transmit channel is disabled or switched off. The undesired direct sound transmission (i.e., direct acoustic feedback) will thus be cancelled out. That is, when the time duration of a half wavelength of the switching frequency is made equal to the direct acoustic delay, the pulses of direct sound energy from the loudspeaker arrive at the microphone just at the time that its transmit path is disabled. To this end, a feedback frequency control circuit monitors the transmit path for pulses of sound energy that appear during the enabled or on periods and in response thereto a correction signal is developed and delivered to the source of the high frequency switching signals to alter the frequency thereof so that its wavelength is adjusted to the proper value, as indicated above.

It is intuitively clear, and it is a particularly advantageous feature, that when the time duration of any odd multiple of half wavelengths of the switching frequency equals the direct acoustic delay time the direct sound pickup will be eliminated in accordance with the invention.

BRIEF DESCRIPTION OF THE DRAWING

The invention will be more fully appreciated from the following detailed description when considered in connection with the accompanying drawing in which.

DETAILED DESCRIPTION

Figure 1:
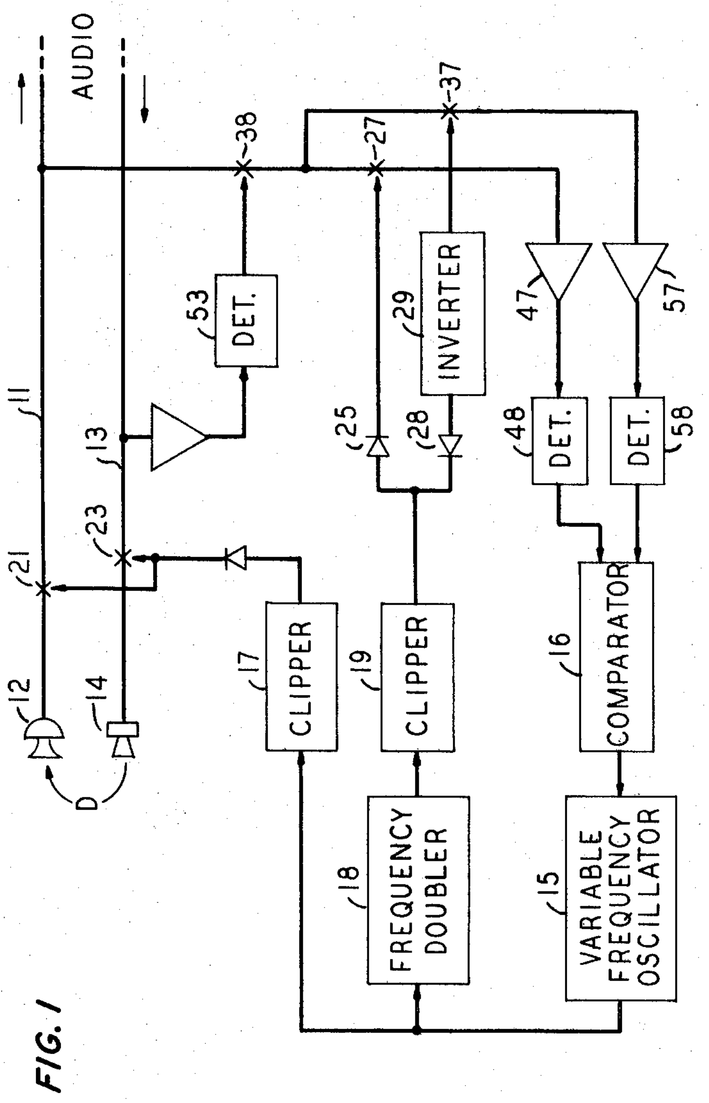
FIG. 1 is a schematic block diagram of switching apparatus for cancelling the undesired direct sound transmission in a loudspeaking telephone set in accordance with the invention.

Referring now to FIG. 1 of the drawing, a typical loudspeaking telephone set, such as a speakerphone, is characterized by a transmitting channel 11 including a microphone 12 and a receiving channel 13 including a loudspeaker 14. The telephone set is connected through a telephone central office (not shown) to another telephone set, which may be a conventional-type telephone or similar loudspeaking apparatus. The acoustic distance D between the loudspeaker 14 and the microphone 12 may be varied by different placement, but during any one actual usage the distance would presumably stay constant. However, it is to be understood that in accordance with the invention there are no constraints whatsoever on the placement of the loudspeaker and microphone and the distance between the same (e.g., 1–3 feet) will typically vary from set to set. In fact, the microphone can be moved during a call and the apparatus of the invention will "track" or correct for this movement so as to continually cancel out the direct sound transmission from the loudspeaker to the microphone.

The apparatus of the invention comprises a variable frequency oscillator 15 which produces a frequency in the range of 10 to 15 kHz. for example. This frequency range is not critical and all that is essential is that the frequency be high enough so that the on-off modulation of speech which is produced will not be objectionable to the ear. The frequency of oscillator 15 is varied in accordance with a feedback control signal from the comparator 16. Numerous arrangements are known in the art for varying an oscillator frequency in response to such a control signal. For example, the oscillator 15 may comprise a conventional L–C tank circuit having a PN junction in parallel therewith. As the potential applied across the PN junction is varied its capacitance changes and this effects a change in the frequency of oscillation.

The output of the oscillator 15 is clipped in a conventional clipper 17 to produce square waves, of the same basic frequency, which turn gates 21 and 23 on and off as shown by the solid line waveform 20 of FIG. 2*a*. Thus the audio paths going to the loudspeaker and coming from the microphone are simultaneously interrupted at the high frequency rate determined by the variable frequency oscillator. The gates 21 and 23, as well as the other gates to be described, are preferably solid-state electronic gates which are substantially noise free—i.e., the paths are turned on and off without producing notable transients or noise.

The pulses of direct sound energy emanating from the loudspeaker 14 will, to a greater or lesser extent, be picked up by the microphone 12 and transmitted over channel 11. It is intuitively clear that if these pulses of sound energy arrive at the microphone just at the time that the transmit channel 11 is disabled or switched off by gate 21, the undesired direct sound transmission (i.e., direct acoustic feedback) will be cancelled out. From the waveform 20 of FIG. 2*a* it will be evident that this result can be achieved if the time duration of a half wavelength (λ/2) of the switching frequency, determined by oscillator 15, is made equal to the direct acoustic delay. Stated inversely, it will be clear that if the acoustic delay equals the time duration of λ/2, the pulses of speech energy passed by enabled gate 23 will arrive at gate 21 at the time that it is disabled. In fact, if the acoustic delay equals the time duration of any odd multiple of half wavelengths of the gate-switching frequency, the pulses of sound energy will arrive at the microphone 12 just at the time that gate 21 is disabled, and the direct sound transmission will thereby be eliminated. A feedback frequency control loop is utilized in accordance with the invention to arrive at the specified equality between half wavelength and acoustic delay. The term acoustic delay has reference to the delay experienced by the sound energy traveling from the loudspeaker to the microphone. The electrical and transducer delays are negligible.

The oscillator frequency is doubled in frequency doubler 18 and the output of the latter is delivered to another clipper 19 to produce square waves of twice the basic frequency illustrated by waveform 20. The diode 25 delivers the square wave signal illustrated by waveform 26 of FIG. 2*b* to gate 27. The diode 28 and inverter 29 serve to deliver the inverse of waveform 26 to the gate 37, as illustrated by the waveform 36 of FIG. 2*c*. Accordingly, gates 27 and 37 are alternately switched on and off in the manner illustrated by the waveforms 26 and 36, respectively.

The purpose of gate 38 can be disregarded for the moment. The gate 27 is enabled during the first half of the enabled or on period of gate 21 so as to couple a sample of the speech energy, if any, in channel 11 to amplifier 47. And the gate 37 is enabled during the second half of the on period of transmit gate 21 to thereby couple a sample of any speech energy in transmit channel 11 to amplifier 57. Thus, the inputs to the two amplifiers 47 and 57 consist of speech energy in the first half of the enabled period of gate 21 and in the second half, respectively.

The amplifiers 47 and 57 are respectively connected to the detectors 48 and 58 and the outputs of the latter are compared in comparator 16. The detectors are preferably full wave and each provides a fair degree of smoothing of the output signal therefrom. The comparator 16 compares the detector output signals and in response to their relative values a correction signal of the appropriate polarity and magnitude is delivered to the variable frequency oscillator 15.

The output of the comparator 16 is indicative of whether the average energy coming from gate 27 is greater of less than that from from gate 37. The comparator output serves to vary the oscillator frequency such that these average energies are made equal. As will be more evident hereinafter, such equality will occur when the pulses of speech energy passed by the enabled gate 23 arrive at the gate 21 just at the time that it is disabled. As indicated hereinbefore, the latter condition results in cancellation of the undesirable direct sound transmission.

Figure 2:
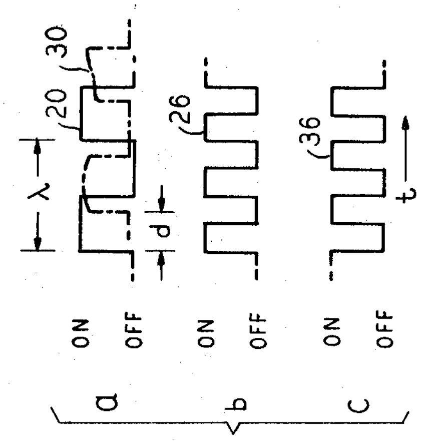
FIG. 2 illustrates certain waveforms useful in the explanation of the invention.

Referring to the waveforms of FIG. 2, the dot-dash waveform 30 of FIG. 2*a* illustrates the pulses of direct sound energy picked up by the microphone 12. The pulse nature of this signal is due, of course, to the on-off switching of the receive channel gate 23 and the assumed delay *d* is the acoustic delay resulting from the physical separation of the loudspeaker and microphone. The locally generated speech signals, if any, can be ignored since the duration of a typical syllabic period extends over many gate-switching cycles and the effect of the same is therefore averaged out. If the on-off gate-switching waveforms 26 and 36 are compared with the waveform 30, it will be evident that the average energy passed by gate 27 will be less than that from gate 37. The comparator 16, in response to this difference, serves to change the oscillator frequency (i.e., the frequency will be increased for the assumed case) until these average energies are equal. This equality is realized when the pulses of speech energy picked up by microphone 12 fall intermediate the enabled or on periods of gate 21, i.e., when the pulses of sound energy arrive at the microphone just as the transmit channel 11 is disabled or switched off. Accordingly, the gates 27 and 37 and the detector and comparator circuitry function as a feedback frequency control loop which adjusts the oscillator frequency so that the undesirable direct sound transmission is eliminated.

The detector 53 monitors the receive channel 13 and in response to detected speech it operates gate 38. This prevents any frequency adjustment from taking place unless speech from the remote end is received. The feedback frequency control loop is disabled until such time.

It is possible, but not too probable, for the loudspeaker and microphone to be separated by a distance such that the direct acoustic delay is exactly equal to the time duration of a full wavelength (λ) of the switching frequency, or some multiple thereof. In this instance, the pulses of speech energy passed by enabled gate 23 will arrive at gate 21 just at the time that it is enabled, and the direct sound transmission (i.e., direct acoustic feedback) will therefore be transmitted to the remote location. Furthermore, the average energy passed by gate 27 will, in this case, be equal to that from gate 37 and the frequency control loop will thus be locked up in this undesirable state. To avert such a situation, the oscillator 15 is preferably constructed to incorporate a certain amount of built-in frequency drift, e.g. ±5 percent per 2–3 second time period. Now if the above-described situation does occur, the built-in frequency drift will tend to shift the gate-switching rate so that the average energies from gates 27 and 37 differ slightly. The feedback control loop will detect this slight energy difference and then accelerate the frequency change in the direction desired, i.e., toward a switching rate such that the direct sound transmission is cancelled as heretofore described. Moreover, for the desired situation, wherein the switching rate is such that the direct sound transmission is cancelled out, the feedback frequency change in the direction desired, i.e., toward a switching rate such that the direct sound transmission is cancelled as heretofore described. Moreover, for the desired situation, wherein the switching rate is such that the direct sound transmission is cancelled out, the feedback frequency control loop is continually operative to maintain optimum acoustic feedback cancellation (i.e., it continually corrects for the drift). In summary, the feedback control loop will inherently discriminate against the first-described essentially unstable situation in favor of the latter stable one. The use of an oscillator with some built-in frequency drift simply initiates the feedback frequency correction operation when the first-described situation exists.

The foregoing disclosure relates to only a preferred embodiment of the present invention and it is to be understood that numerous modifications or alterations may be made therein without departing from the spirit and scope of the invention.

What is claimed is:

1. A loudspeaking telephone set comprising a transmitting channel including a microphone, a receiving channel including a loudspeaker, gating means connected in each of said channels, a source of high frequency signals, means for coupling said high frequency signals to said gating means to enable and disable the same at the high frequency rate, and means for controlling the frequency of said source so that the time duration of an odd multiple of half wavelengths of the source frequency equals the direct acoustic delay between the loudspeaker and the microphone.

2. A loudspeaking telephone set as defined in claim 1 including means for disabling the frequency control means in the absence of speech energy in said receiving channel.

3. A loudspeaking telephone set as defined in claim 2 wherein the signals of said source are of a frequency greater than 10 kHz., whereby the modulation of speech produced by the gating means is not objectionable to a local user.

4. A loudspeaking telephone s et as defined in claim 1 wherein the frequency of said source is controlled so that the time duration of a half wavelength of the source frequency equals said direct acoustic delay.

5. In combination, a transmitting telephone channel including a microphone, a receiving telephone channel including a loudspeaker, gating means connected in each of said channels, a source of high frequency switching signals, means for coupling said switching signals to said gating means to switch the same on and off at the high frequency switching rate, and means for controlling the frequency of said source so that the pulses of direct sound energy from the loudspeaker arrive at the microphone just at the time that the transmitting channel is switched off by said gating means.

6. A loudspeaking telephone set comprising a transmitting channel including a microphone, a receiving channel including a loudspeaker, a pair of gates respectively connected in the transmit and receive channels, means for producing square wave signals at a high frequency rate, means for coupling said square wave signals to said gates to simultaneously switch the same on and off at the high frequency rate, means for monitoring the transmit channel for pulses of sound energy that appear during the on periods of the gate connected therein, means coupled to the monitor means and responsive to a differential energy distribution of said sound energy in said on periods to generate a control signal indicative of the same, and means for coupling said control signal to the high frequency signal producing means to alter its frequency such that the time duration of an odd multiple of half wavelengths thereof equals the direct acoustic delay between the loudspeaker and the microphone.